US011882529B1

(12) United States Patent
Tiirola et al.

(10) Patent No.: US 11,882,529 B1
(45) Date of Patent: Jan. 23, 2024

(54) WAVEFORM MANAGEMENT

(71) Applicant: Nokia Technologies Oy, Espoo (FI)

(72) Inventors: Esa Tapani Tiirola, Oulu (FI); Kari Juhani Hooli, Oulu (FI); Cássio Barboza Ribeiro, Espoo (FI); Marco Maso, Massy (FR); Alessio Marcone, Munich (DE); Nhat-Quang Nhan, Massy (FR); Youngsoo Yuk, Seoul (KR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/348,124

(22) Filed: Jul. 6, 2023

(30) Foreign Application Priority Data

Jul. 15, 2022 (FI) ........................................ 20225673

(51) Int. Cl.
*H04W 52/36* (2009.01)
(52) U.S. Cl.
CPC ....... *H04W 52/367* (2013.01); *H04W 52/365* (2013.01)
(58) Field of Classification Search
CPC .......................... H04W 52/365; H04W 52/367
See application file for complete search history.

(56) References Cited

U.S. PATENT DOCUMENTS

| | | | |
|---|---|---|---|
| 2018/0124710 A1 | 5/2018 | Ly et al. | |
| 2018/0324005 A1* | 11/2018 | Kim | ................... H04L 27/2035 |
| 2018/0324715 A1* | 11/2018 | Ryoo | ................... H04W 52/365 |
| 2020/0068506 A1* | 2/2020 | Liu | ................... H04L 27/0008 |
| 2020/0196252 A1 | 6/2020 | Osawa et al. | |
| 2020/0288412 A1* | 9/2020 | Ajdakple | ............. H04W 52/242 |
| 2021/0281455 A1* | 9/2021 | Lee | ................... H04L 27/0008 |
| 2021/0298048 A1* | 9/2021 | Sosnin | ................... H04L 1/0071 |
| 2022/0376965 A1* | 11/2022 | Ramirez-Gutierrez | ...................... H04W 72/23 |

FOREIGN PATENT DOCUMENTS

| | | |
|---|---|---|
| EP | 3557918 A1 | 10/2019 |
| WO | 2018/177549 A1 | 10/2018 |
| WO | 2019/018112 A1 | 1/2019 |

(Continued)

OTHER PUBLICATIONS

"New WI: Further NR coverage enhancements", 3GPP TSG RAN Meeting #94e, RP-213579, Agenda: 8.6.1, China Telecom, Dec. 6-17, 2021, 5 pages.

(Continued)

*Primary Examiner* — Raymond S Dean
(74) *Attorney, Agent, or Firm* — Nokia Technologies Oy

(57) ABSTRACT

According to an example aspect of the present invention, there is provided an apparatus, such as a user equipment, configured to transmit information in a physical uplink shared channel direction using, selectably, a first waveform or a second waveform, the second waveform having lower peak to average power ratio than the first waveform, provide, to a network node controlling a cell in which the apparatus is attached, first and second power headroom information, and select to either continue using the first waveform on the physical uplink shared channel, or to switch to using the second waveform on the physical uplink shared channel.

12 Claims, 5 Drawing Sheets

(56) References Cited

FOREIGN PATENT DOCUMENTS

WO      2021/260660 A1    12/2021

OTHER PUBLICATIONS

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.4.0, Dec. 2021, 626 pages.

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.4.0, Dec. 2021, pp. 1-187.

"3rd Generation Partnership Project; Technical Specification Group Radio Access Network; NR; User Equipment (UE) radio transmission and reception; Part 3: Range 1 and Range 2 Interworking operation with other radios (Release 17)", 3GPP TS 38.101-3, V17.4.0, Dec. 2021, pp. 1-939.

"3rd Generation Partnership Project; Technical Specification Group Radio Access Network; NR; NR and NG-RAN Overall Description; Stage 2 (Release 16)", 3GPP TS 38.300, V16.8.0, Dec. 2021, pp. 1-152.

"3rd Generation Partnership Project; Technical Specification Group Radio Access Network; NR; Requirements for support of radio resource management (Release 17)", 3GPP TS 38.133, V17.4.0, Dec. 2021, 3230 pages.

"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.

"3rd Generation Partnership Project; Technical Specification Group Radio Access Network; NR; Medium Access Control (MAC) protocol specification (Release 16)", 3GPP TS 38.321, V16.7.0, Dec. 2021, pp. 1-158.

"3rd Generation Partnership Project; Technical Specification Group Radio Access Network; NR; Physical channels and modulation (Release 17)", 3GPP TS 38.211, V17.0.0, Dec. 2021, pp. 1-134.

"3rd Generation Partnership Project; Technical Specification Group Radio Access Network; NR; Multiplexing and channel coding (Release 17)", 3GPP TS 38.212, V17.0.0, Dec. 2021, pp. 1-190.

"3rd Generation Partnership Project; Technical Specification Group Radio Access Network; NR; Physical layer procedures for control (Release 17)", 3GPP TS 38.213, V17.0.0, Dec. 2021, pp. 1-225.

"3rd Generation Partnership Project; Technical Specification Group Radio Access Network; NR; Physical layer procedures for data (Release 17)", 3GPP TS 38.214, V17.0.0, Dec. 2021, pp. 1-217.

"3rd Generation Partnership Project; Technical Specification Group Radio Access Network; NR; Physical layer measurements (Release 17)", 3GPP TS 38.215, V17.0.0, Dec. 2021, pp. 1-26.

Office action received for corresponding Finnish Patent Apploication No. 20225673, dated Oct. 14, 2022, 10 pages.

"3rd Generation Partnership Project; Technical Specification Group Radio Access Network; Evolved Universal Terrestrial Radio Access (E-UTRA); User Equipment (UE) radio transmission and reception (Release 17)", 3GPP TS 36.101, V17.6.0, Jun. 2022, 2029 pages.

Office action received for corresponding Finnish Patent Application No. 20225673, dated Mar. 21, 2023, 6 pages.

International Search Report and Written Opinion received for corresponding Patent Cooperation Treaty Application No. PCT/EP2023/056532, dated Jun. 14, 2023, 12 pages.

\* cited by examiner

```
┌─────────────────────────────────────────────────┐
│ Transmitting from an apparatus information in   │ 510
│ a physical UL shared channel using, selectably, │
│ a 1st or 2nd waveform, WF, the 2nd WF           │
│ having lower PAPR than the 1st WF               │
└─────────────────────────────────────────────────┘
┌─────────────────────────────────────────────────┐
│ Providing to a NW node controlling a cell       │ 520
│ where the apparatus is attached, 1st and 2nd    │
│ PH information, the 1st PH info disclosing a    │
│ quantity of power between a max allowed or      │
│ achievable TX power and a 1st TX power,         │
│ currently used by the apparatus to transmit on  │
│ the 1st WF, the 2nd PH information disclosing   │
│ a quantity of power between the max TX          │
│ power, or a max. achievable power using the     │
│ 2nd WF, and a 2nd TX power the apparatus        │
│ would use if the apparatus were using the 2nd   │
│ WF                                              │
└─────────────────────────────────────────────────┘
┌─────────────────────────────────────────────────┐
│ Selecting to either continue using the 1st WF   │ 530
│ on the physical UL shared channel, or to switch │
│ to using the 2nd WF on the physical UL shared   │
│ channel                                         │
└─────────────────────────────────────────────────┘
```

FIGURE 5

WAVEFORM MANAGEMENT

RELATED APPLICATIONS

The present application claims priority from, and the benefit of, Finnish Application No. 20225673, filed Jul. 15, 2022, which is hereby incorporated by reference in its entirety.

FIELD

The present disclosure relates to management of wireless communication processes.

BACKGROUND

In some wireless communication systems, more than one signal waveform is usable in wireless communication between a user equipment, UE, and an access node, such as, for example, a base station. A waveform of a signal corresponds to a shape of a graph of the signal as a function of time. Examples of waveforms include sinusoid, square and triangle waveforms, although in communication systems the waveforms are more complex in shape owing to modulation used. Modulation used in wireless communication systems may be of a high order, and in general a modulation scheme is correlated with a characteristic waveform of the modulation scheme.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to transmit information in a physical uplink shared channel direction using, selectably, a first waveform or a second waveform, the second waveform having lower peak to average power ratio than the first waveform, provide, to a network node controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform, and select to either continue using the first waveform on the physical uplink shared channel, or to switch to using the second waveform on the physical uplink shared channel.

According to a second aspect of the present disclosure, there is provided an apparatus comprising at least one processing core, at least one memory including computer program code, the at least one memory and the computer program code being configured to, with the at least one processing core, cause the apparatus at least to receive information on a physical uplink channel direction using, selectably, a first waveform or a second waveform, the second waveform having lower peak to average power ratio than the first waveform, receive, from a user equipment, UE, attached to a cell controlled by the apparatus, first and second power headroom information, the first power headroom information disclosing a quantity of power between a maximum allowed or achievable transmit power and a first transmit power, currently used by the UE to transmit on the physical uplink channel using the first waveform, the second power headroom information disclosing a quantity of power between the maximum allowed transmit power, or a maximum achievable power using the second waveform, and a second transmit power that the UE would use to transmit on the physical uplink channel if the UE were using the second waveform, and select to either continue using the first waveform on the physical uplink channel, or to switch to using the second waveform on the physical uplink channel.

According to a third aspect of the present disclosure, there is provided a method comprising transmitting, by an apparatus, information in a physical uplink shared channel direction using, selectably, a first waveform or a second waveform, the second waveform having lower peak to average power ratio than the first waveform, providing, to a network node controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform, and selecting to either continue using the first waveform on the physical uplink shared channel, or to switch to using the second waveform on the physical uplink shared channel.

According to a fourth aspect of the present disclosure, there is provided a method, comprising receiving, by an apparatus, information on a physical uplink channel direction using, selectably, a first waveform or a second waveform, the second waveform having lower peak to average power ratio than the first waveform, and receiving, from a user equipment, UE, attached to a cell controlled by the apparatus, first and second power headroom information, the first power headroom information disclosing a quantity of power between a maximum allowed or achievable transmit power and a first transmit power, currently used by the UE to transmit on the physical uplink channel using the first waveform, the second power headroom information disclosing a quantity of power between the maximum allowed transmit power, or a maximum achievable power using the second waveform, and a second transmit power that the UE would use to transmit on the physical uplink channel if the UE were using the second waveform, and selecting to either continue using the first waveform on the physical uplink channel, or to switch to using the second waveform on the physical uplink channel.

According to a fifth aspect of the present disclosure, there is provided an apparatus comprising means for transmitting, information in a physical uplink shared channel direction using, selectably, a first waveform or a second waveform, the second waveform having lower peak to average power ratio than the first waveform, providing, to a network node controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform, and selecting to either continue using the first waveform on the physical uplink shared channel, or to switch to using the second waveform on the physical uplink shared channel.

According to a sixth aspect of the present disclosure, there is provided an apparatus comprising means for receiving information on a physical uplink channel direction using, selectably, a first waveform or a second waveform, the second waveform having lower peak to average power ratio than the first waveform, and receiving, from a user equipment, UE, attached to a cell controlled by the apparatus, first and second power headroom information, the first power headroom information disclosing a quantity of power between a maximum allowed or achievable transmit power and a first transmit power, currently used by the UE to transmit on the physical uplink channel using the first waveform, the second power headroom information disclosing a quantity of power between the maximum allowed transmit power, or a maximum achievable power using the second waveform, and a second transmit power that the UE would use to transmit on the physical uplink channel if the UE were using the second waveform, and selecting to either continue using the first waveform on the physical uplink channel, or to switch to using the second waveform on the physical uplink channel.

According to a seventh aspect of the present disclosure, there is provided a non-transitory computer readable medium having stored thereon a set of computer readable instructions that, when executed by at least one processor, cause an apparatus to at least transmit information in a physical uplink shared channel direction using, selectably, a first waveform or a second waveform, the second waveform having lower peak to average power ratio than the first waveform, provide, to a network node controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform, and select to either continue using the first waveform on the physical uplink shared channel, or to switch to using the second waveform on the physical uplink shared channel.

According to an eighth aspect of the present disclosure, there is provided a non-transitory computer readable medium having stored thereon a set of computer readable instructions that, when executed by at least one processor, cause an apparatus to at least receive information on a physical uplink channel direction using, selectably, a first waveform or a second waveform, the second waveform having lower peak to average power ratio than the first waveform, and receive, from a user equipment, UE, attached to a cell controlled by the apparatus, first and second power headroom information, the first power headroom information disclosing a quantity of power between a maximum allowed or achievable transmit power and a first transmit power, currently used by the UE to transmit on the physical uplink channel using the first waveform, the second power headroom information disclosing a quantity of power between the maximum allowed transmit power, or a maximum achievable power using the second waveform, and a second transmit power that the UE would use to transmit on the physical uplink channel if the UE were using the second waveform, and select to either continue using the first waveform on the physical uplink channel, or to switch to using the second waveform on the physical uplink channel.

BRIEF DESCRIPTION OF THE DRAWINGS

FIG. 5 is a flow graph of a method in accordance with at least some embodiments of the present invention.

EMBODIMENTS

Herein are disclosed methods to facilitate switching between waveforms in cellular communication, wherein user equipments, UEs, provide assistance information to base stations, or more generally network nodes, to assist the waveform switching. The assistance information may comprise power headroom reports, or other power headroom information, for more than one waveform, to enable the base station to select a waveform to use. The UE may switch waveform either as a response to an explicit or implicit instruction from the base station to do so, or autonomously, consistently with the assistance information sent to the base station. Such switching provides a technical benefit in terms of enabling use of a higher power for communication, which improves performance in low coverage situations.

Figure 1:
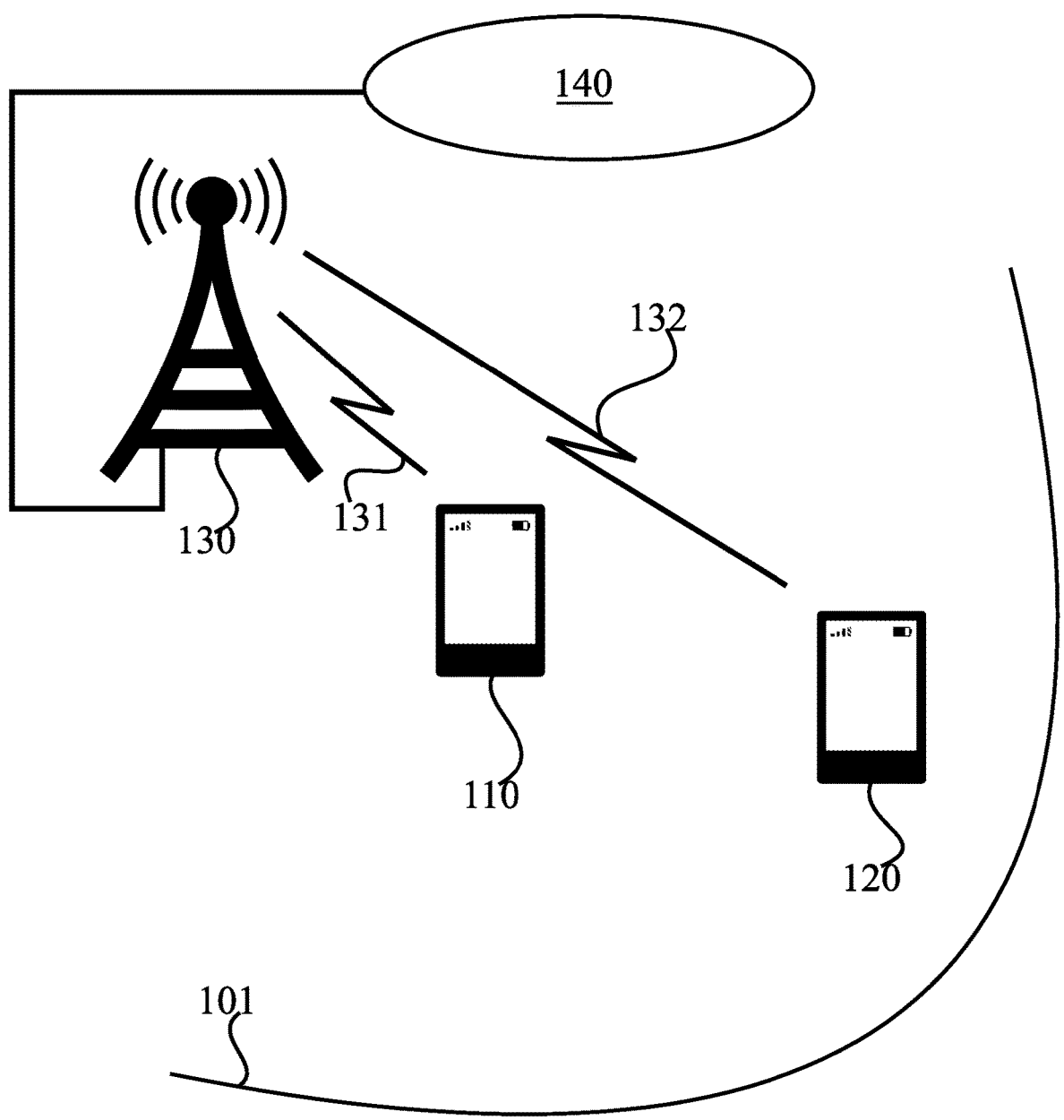
FIG. 1 illustrates an example system in accordance with at least some embodiments of the present invention.

FIG. 1 illustrates an example system in accordance with at least some embodiments of the present invention. The system is a cellular communication system such as, for example, a fifth generation, 5G, also known as new radio, NR, 5G-Advanced, 6G or long term evolution, LTE, system as specified by the 3rd Generation Partnership Project, 3GPP. Some implementations of the present disclosure may also be accomplished in non-cellular systems, such as wireless local area network, WLAN, for example. The system comprises a base station 130, which may be referred to as a gNB or eNB, for example, depending on the specific technology the system is based on. Base station 130 may be distributed in that it may comprise one or more base station device, for example, base station 130 may comprise a centralized unit, CU, and one or more distributed unit, DU. A CU provides support for higher layers, such as radio resource control, RRC, while DUs handle lower layers, such as radio link control, RLC, and medium access control, MAC. In some embodiments, base station 130 is a unitary device and not distributed in nature.

Base station 130 is coupled with core network, CN, 140. CN 140 comprises nodes, such as mobility management entities, MMEs, subscriber data repositories and gateways, which serve the communication system as a whole and enable interworking with further networks, which are not illustrated in FIG. 1 for the sake of clarity. The exact names and specific functions of core network nodes, and the way CN tasks are distributed between them, depends on the technology the system of FIG. 1 is based on in each specific implementation. CN 140 may be connected to the further networks via the gateways.

Base station 130 controls a cell, the cell edge of which is schematically illustrated in FIG. 1 as edge 101. In the cell are disposed UEs 110, 120, of which UE 110 is close to base station 130 and UE 120 is close to edge 101. UE 110 communicates with base station 130 via radio link 131, and UE 120 communicates with base station 130 via radio link 132. Radio links 131, 132 may each comprise an uplink, UL, and downlink, DL, for communicating toward base station 130 and the UEs, respectively.

In general UEs may be capable of moving in the coverage area of a cell and crossing over edge 101 to coverage areas of other cells, even though some UEs may be stationary in nature in that their location does not change. Examples of such stationary UEs are communication modules of utility meters and closed-circuit video cameras, while mobile UEs include smartphones, tablet computers, laptop computers, mobile phones, and connected car connectivity modules. As such, the same UE may be near cell edge 101 and far from the edge, depending on its movement. Even for stationary UEs the distance to the cell edge 101 may change if the network is re-configured and edge 101 moves.

A physical uplink control channel, PUCCH, in NR is an example of an uplink control channel and is used to carry uplink control information, UCI, such as scheduling requests, SRs, and could also be used for beam failure recovery, BFR, requests or link failure recovery requests, hybrid automatic repeat request acknowledgements, HARQ-ACKs, and channel state information, CSI. Typically, a cyclic prefix OFDM, CP-OFDM, waveform may be used with physical uplink channel for UEs which are not coverage-limited and when better coverage is required, a discrete Fourier transform-spread OFDM, DFT-s-OFDM, waveform may be used with physical uplink channel. DFT-s-OFDM has a lower PAPR than CP-OFDM and is thus, in general, more suited to coverage-limited situations, such as UE 120 near the cell edge 101. CP-OFDM, on the other hand, has higher spectral efficiency and may be seen as preferable when enhanced coverage is not needed. An example of the physical uplink channel is a physical uplink shared channel, PUSCH.

Switching dynamically between waveforms, such as between CP-OFDM and DFT-s-OFDM, would be beneficial since the DFT-s-OFDM waveform is beneficial for UL coverage limited and power-limited scenarios because of its lower PAPR compared to the CP-OFDM waveform, and UEs, as noted, may roam to different parts of a coverage area of a cell. The UL waveform may be configured to the UE via RRC signaling, which incurs a high signaling load to accomplish the change of waveform. It would thus be beneficial to switch between waveforms using a more optimized signaling solution incurring lower signaling load and shorter latency than RRC signaling.

When adapting transmit power of a UE, the base station may know only the maximum power reduction, MPR, requirement and a power headroom reported by the UE. The MPR defines an allowed reduction of maximum power level for certain combinations of modulation used and the number and location of resource blocks that are assigned. For example, the power may be dynamically reduced to comply with adjacent-channel power leakage requirements. Some technologies enforce signal quality standards at the UE. In some cases, when scheduling is difficult from the point of view of a power amplifier at the UE, the UE is allowed to reduce its transmit power. The power reduction may be 2 dB, for example. MPR may be separately defined for different modulation schemes and waveforms. A power headroom report, PHR, on the other hand discloses a difference between a nominal maximum UE transmit power and the current power used for uplink transmission. In other words, the PHR discloses how much further the UE could increase its transmit power without breaching its nominal maximum transmit power, which may alternatively be known as configured maximum output power. PHR may be used to support power-aware packet scheduling, for example, and PHR may be provided from the UE to the base station in a MAC control element, MAC CE, for example. The power headroom may be obtained as power headroom=UE maximum nominal transmission power−PUSCH power. In at least some systems, the signalled PHR may have a value between zero and 63, expressing the power headroom with a granularity of one decibel, dB. In other words, the PHR resolution may be fairly coarse in its ability to express the headroom. In a coverage-limited scenario, a 1 dB change, or even a half-dB change, in transmit power can make a considerable difference to communication. The power headroom is also dependent on the waveform in use.

The actual power levels, transmit power indicated to UE via power control commands and maximum transmit power that a specific UE implementation can provide for current transmission is typically known only by the UE. It would thus be beneficial to facilitate the base station to perform more optimal waveform selection.

In a 3GPP system example, UE transmit power on PUSCH is determined by:

$$P_{PUSCH,b,f,c}(i, j, q_d, l) = \min \begin{Bmatrix} P_{CMAX,f,c}(i) \\ P_{O\_PUSCH,b,f,c}(j) + 10\log_{10}(2^{\mu} \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} [dBm]$$

where the transmission power is capped by $P_{CMAX,f,c}(i)$, which is defined as the UE configured maximum output power. UE can set the $P_{CMAX,f,c}$ value in each slot, as long as the $P_{CMAX,f,c}$ is set within the bounds $P_{CMAX\_L,f,c}$ ≤$P_{CMAX,f,c}$≤$P_{CMAX\_H,f,c}$, where $P_{CMAX\_L,f,c}$=MIN {$P_{EMAX,c}$−$\Delta T_{C,c}$, ($P_{PowerClass}$−$\Delta P_{PowerClass}$)−MAX(MAX(MPR$_c$+ ΔMPR$_c$, A−MPR$_c$)+$\Delta T_{IB,c}$+$\Delta T_{C,c}$+$\Delta T_{RxSRS}$, P-MPR$_c$)} and $P_{CMAX\_H,f,c}$=MIN {$P_{EMAX,c}$, $P_{PowerClass}$−$\Delta P_{PowerClass}$}. The terms are described in 3GPP technical standards, TS, 38.101-1/38.101-2/38.101-3. Significantly, the base station is not aware of the $P_{CMAX,f,c}(i)$ value that UE uses, the base station knows only the boundaries within which $P_{CMAX,f,c}(i)$ is.

Methods disclosed herein incorporate waveform assistance signalling from the UE to the base station and, in some embodiments, waveform selection commands from the base station to the UE.

Examples of assistance information received in base station 130 from UE 110, 120 include power headroom information in the form of waveform specific power headroom values, such as, $P_{Cmax,c}$ for both waveforms embedded in PHR. The waveform specific power headroom values may be specific to both waveform and modulation and coding scheme, MCS. Waveform assistance information may be embedded in PHR and/or a scheduling request, SR, transmitted from the UE to the base station. Further, or alternatively, separate power headroom reports, PHRs, may be provided from the UE for multiple waveforms. Alternatively to separate PHRs, the assistance information may comprise plural waveform-specific power headroom values, relating to more than one waveform, embedded in a single power headroom report. In some embodiments, the assistance information relates to two waveforms with the same physical resource block, PRB, allocation and MCS. A waveform-specific power headroom value may comprise an indication in a PHR dedicated to one waveform, of a power headroom value of another waveform expressed relative to the power headroom value of the one waveform. In general, power headroom information may comprise a PHR dedicated to a specific waveform, such that more than one such PHR may be sent by the UE to deliver power headroom information specific to more than one waveform, or the power headroom information may comprise a waveform specific power headroom value included in a PHR dedicated to another waveform, such as a DFT-s-OFDM specific power headroom value included in a CP-OFDM PHR.

The assistance information may comprise e.g. a single bit indicating that DFT-s-OFDM is preferred for current PUSCH transmission. Alternatively, multiple bits may be used to indicate that DFT-s-OFDM is preferred for pre-defined scenarios. The assistance information may cover also multiple PRB ranges and/or multiple modulation schemes.

For a pi/2 BPSK scenario, the assistance information may cover both pi/2 BPSK without power boosting and/or pi/2 BPSK with power boosting. Power boosting may be restricted to specific preconfigured bands, and may involve a duty cycle restriction. For a QPSK scenario, it may cover a scenario without spectrum extension and/or FDSS with spectrum extension.

Figure 2:
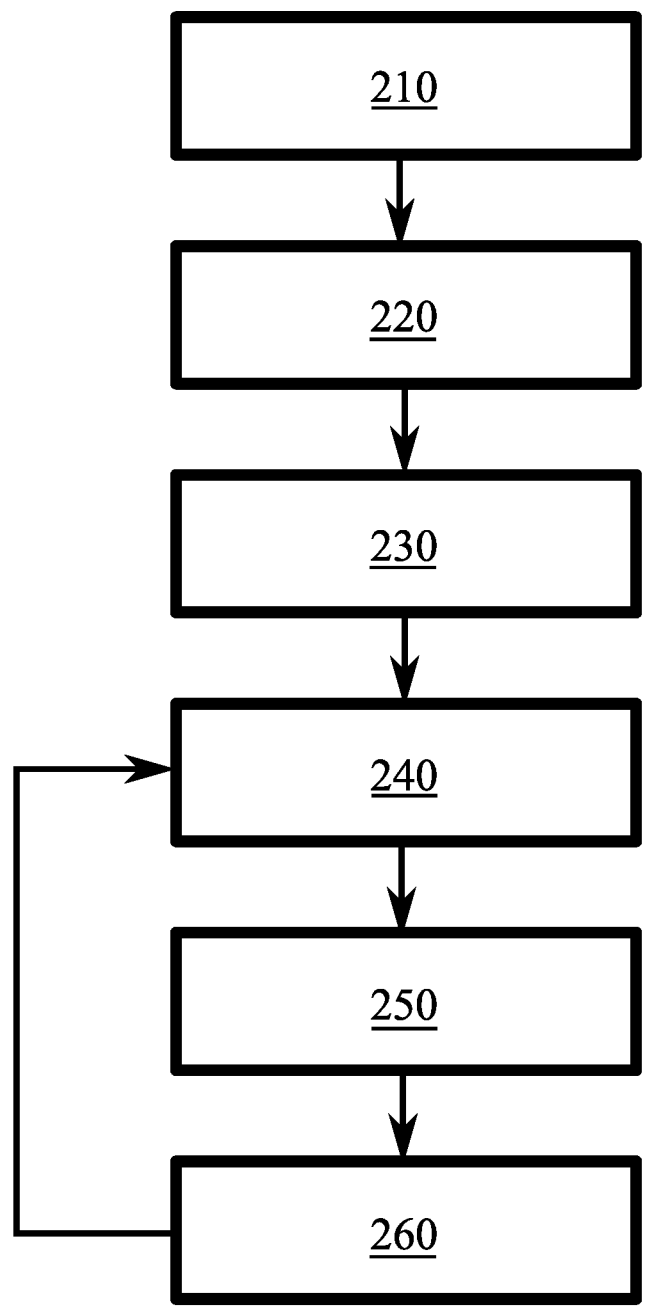
FIG. 2 illustrates an example process in accordance with at least some embodiments of the present invention.

FIG. 2 illustrates an example process in accordance with at least some embodiments of the present invention. The process is performed in the UE. In phase 210, the UE operates according to a first waveform, for example one configured using RRC signaling. In phase 220, the UE receives a configuration for another, second, waveform from the base station. The configuration may comprise a definition of radio resources to be used with the second waveform. The UE stores the configuration but does not yet take it into use, continuing operation using the first waveform. In phase 230, the UE receives a configuration for transmitting waveform assistance information to the base station. This configuration may comprise a definition of a container in which the assistance information is to be provided, and information defining what information to include in the assistance information to provide to the base station. Phases 220 and 230 may take place at the same time, at least partly.

The configuration for transmitting waveform assistance information may also comprise a description of at least one trigger event to trigger the transmission of the waveform assistance information to the base station. The trigger event may comprise that a request for the assistance information is received in the UE, or that circumstances in the UE fulfil at least one criterion. The trigger event may be based on a fixed timer, such that the assistance information is provided at set, fixed and equal time intervals, such as every five or every 30 seconds. Another example of the trigger event is that a path loss of a radio path between the UE and the base station changes by more than a first threshold, which may be expressed in decibels, for example. A further example of the trigger event is one where the UE changes the applied MPR by more than a configured value. A yet further example is a determination that a difference in a power value, such as transmit power, configured maximum transmit power or a power headroom, between the first and second waveforms in a predefined scenario changes by more than a second threshold, which may also be expressed in decibels, for example. The transmit power may be the transmit power of a specific channel, such as PUSCH. A further alternative is a case where the power value, such as a maximum transmit power or a power headroom, exceeds a third threshold.

In phase 240, the UE determines that at least one of the trigger events takes place in the UE, and responsively, phase 250, the UE transmits the waveform assistance information to the base station. As noted above, the assistance information may comprise, for example, first and second power headroom information, relating respectively to the first and to the second waveform. As noted above, the first and second power headroom information may be provided in separate PRHs or in one PRH, or indeed in another message.

In phase 260, the UE switches to the second waveform, responsive to either an instruction to that effect from the base station, or autonomously, based on the transmitted waveform assistance information or characteristics of the situation the waveform assistance information originates in. The base station may send the instruction to change waveform in a downlink control information, DCI, field, for example, or use a specific type of DCI to explicitly or implicitly instruct the change of waveform. Another option is to use MAC CE for switching between different waveforms. Waveform specific power headroom is one criterion for switching, but other criteria may also, or alternatively, be applied, as described herein above. Also the number of waveforms is not limited to two but may be three, or more than three.

The operation of the system is next described by way of examples. In a first example, an enhanced power headroom report is employed as the waveform assistance information. In general, separate first and second power headroom information is sent for the first and second waveforms, respectively. As noted above, the power headroom information specifies, how much more power may be used by the UE without breaching the nominal maximum transmit power of the UE. Due to differences in waveform characteristics, it is possible that switching to another waveform, such as a lower-PAPR waveform, the power headroom is greater, and consequently more power may be used by the UE.

In an embodiment of this, the UE is configured with separate power headroom reports for DFT-s-OFDM and OFDM. These can be carried out via one or two MAC messages. Alternatively, an existing PHR may be used for the current waveform (that is, PUSCH waveform carrying PHR). This is the first power headroom information. This PHR is enhanced to carry an waveform-specific value relating to the other waveform as the other power headroom information, such that the same PHR has both the first and the second power headroom information. Relative information as the waveform-specific value, where the power headroom information is expressed relative to the used waveform power headroom, may provide good accuracy, hence solving also the problem regarding the low resolution of PHR messages for cell edge UEs. This could be made with 2-4 bits, for example. The waveform specific value may define, by how many decibels the power headroom of the second waveform differs from that of the first waveform, which is expressed via the PHR as an absolute value.

In case 3 bits are used, the signalling value range could be [0 0.5 1 1.5 2 2.5 3 3.5] dB, where numbers could be positive or negative depending on which waveform is taken as a reference for the PHR. For instance, and assuming that DFT-s-OFDM waveform always provides higher transmit power compared to CP-OFDM, these values could be positive if the reference waveform used for PHR calculation is CP-OFDM, and negative otherwise. Another option could be to have signalling containing both positive and negative values. In this case, the waveform specific value would be expressed directly against the current waveform.

In a second example, a power headroom report is used to express a difference between a currently used transmit PUSCH power and a maximum achievable power in a current configuration from the UE. This difference, delta, may be determined separately for the first and second waveforms and provided to the base station. The delta values may be provided in a same message, or in separate messages, in particular, the same or separate messages may be PHR reports enhanced to include the delta. In this case the deltas, separately for the first and second waveforms, are the first and second power headroom information, respectively. The maximum achievable power is dependent on the situation at hand and thus differs from the nominal maximum transmit power of the UE. In particular, the maximum achievable power depends on the waveform, the PRB allocation, UE implementation, and the modulation scheme. It thus provides more accurate information than the comparison to the nominal maximum UE power concerning how much more power would be obtainable by switching dynamically to the other waveform. This is so, since in any given configuration it is unlikely that the UE could be set to transmit at precisely the nominal maximum UE transmit power.

In a third example, implicit waveform switching that is activated/deactivated by UE will be described. When the UE reports that a power headroom value is below, or in some embodiments above, a preconfigured threshold, implicit waveform switching is activated. This may be based on downlink control information, DCI, values from the base station, for example. The threshold may be configured to UE by the base station. Separate thresholds may be applied depending on waveform used for PHR. A lower threshold value may used with PHR for CP-OFDM and a higher threshold value with PHR for DFT-s-OFDM. The implicit signaling may be combined with the power headroom reporting described above, using either the nominal maximum UE transmit power or the maximum achievable power in a current configuration from the UE.

In an implicit switching indication, certain DCI parameter values may indicate a switch to the DFT-s-OFDM waveform from the CP-OFDM waveform. The base station may indicate the selected waveform by scheduling PUSCH with such values. When such implicit switching is activated, UE transmits with DFT-s-OFDM waveform when the base station indicates e.g. a MCS value, such as BPSK or QPSK, from a predefined or configured set of MCS values and below a threshold, or a number of PRBs below a certain threshold.

In another embodiment of the implicit indication, the waveform change is indicated when UL grant parameters, signaled via DCI, cause a transmit power change with respect to the transmit power used for the determination of the latest PHR, which exceeds a determined transmit power change limit.

The determined transmit power change limit may be the reported power headroom value, reduced by a configured threshold: limit=power headroom−threshold. Thus when the UE reports a larger power headroom, a larger change in transmit power is needed before DFT-s-OFDM waveform is selected.

For example, a DFT-s-OFDM waveform may be selected when PRB allocation causes a transmit power change that exceeds the (power headroom value−threshold):

$$10 \log_{10}(2^\mu M_{RB}^{PUSCH}) - 10 \log_{10}(2^\mu M_{RB,PH}^{PUSCH}) > PH - Th, \text{ where}$$

$M_{RB,PH}^{PUSCH}$ is the number RBs used in PH determination, PH is the reported power headroom, Th is the configured threshold.

In the third example, of implicit signalling, transmit power changes need to be caused by base station scheduling so that both the base station and the UE have the same interpretation of which waveform is to be used. Such changes may be caused by PRB allocation, MCS (possibly changing the MCS offset in transmit power control, TPC), and closed loop TPC commands. Changes in estimated path loss may be excluded. Hence the transmit power change calculated to determine implicit signalling of waveform may differ from the change in transmit power used in PUSCH transmission, which includes the effect of estimated path loss.

In a fourth example, autonomous waveform switching is activated by the UE as a response to the waveform assistance information without an implicit or explicit instruction from the base station to switch waveform. When the UE reports that power headroom value for a current waveform is below, or in some embodiments above, a threshold, autonomous waveform switching to/from DFT-s-OFDM is performed at both gNB and UE. The UE then expects a DCI from the base station with fields related to the new activated waveform starting from a certain time after the report.

Figure 4:
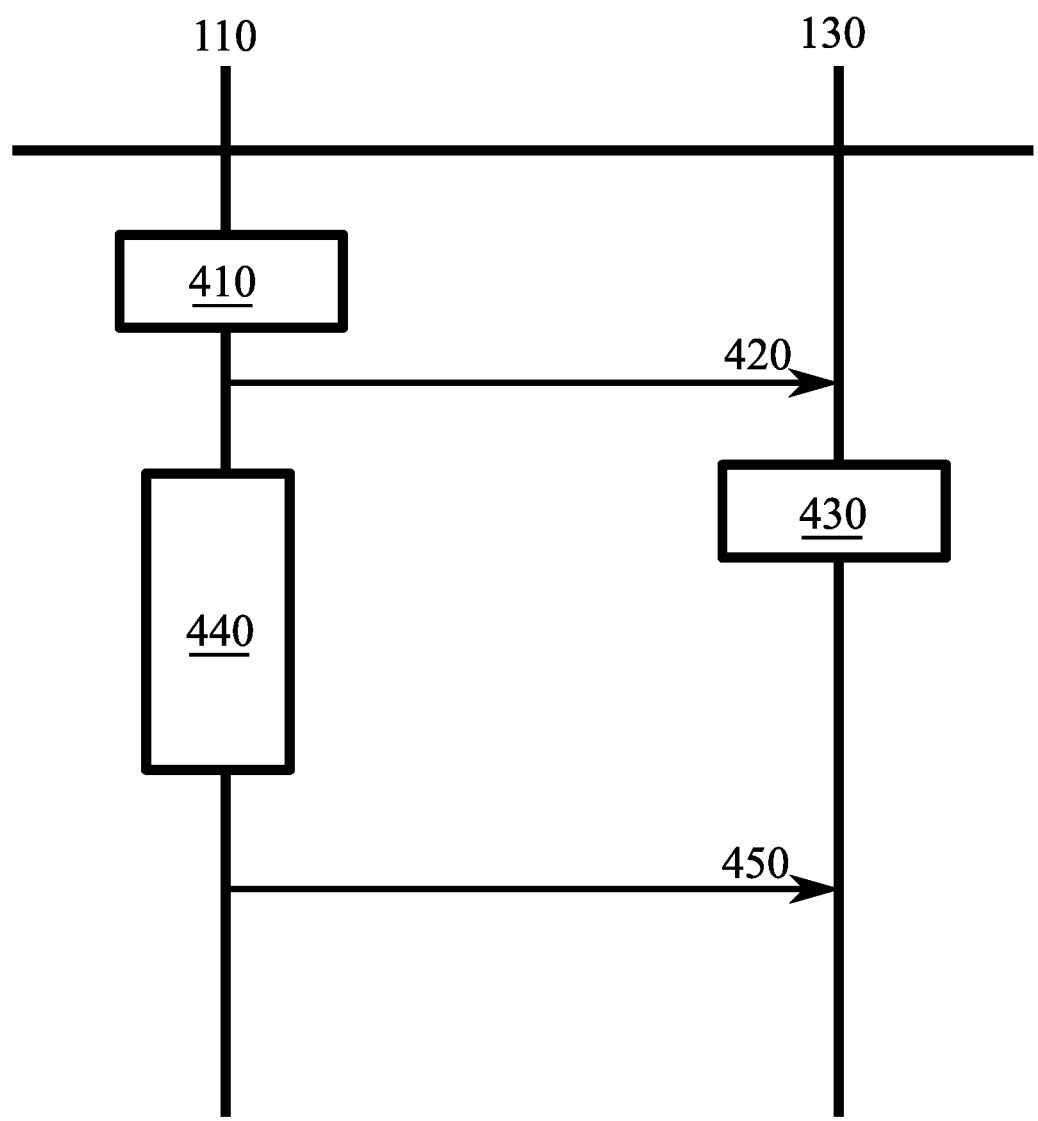
FIG. 4 illustrates signalling in accordance with at least some embodiments of the present invention.

The certain time after the report would provide the base station an opportunity to either request a re-transmission of the MAC message, in case the waveform assistance information is carried in a MAC packet data unit, PDU, or indicate that the waveform assistance information transmission or reception failed. This way the UE would not switch waveform if PHR detection fails at the base station, and ambiguity as to the waveform to be used between the base station and the UE is avoided. This is illustrated in FIG. 4.

Methods disclosed herein provide ways for the base station to facilitate more optimal waveform selection. For example, where radio-frequency, RF, performance limits transmit power (MPR difference between two waveforms is 1.5 dB for QPSK). In this scenario, the base station might receive the following PHR reports:

1) PHR for CP-OFDM (=transmit waveform in this example) is 1 dB
2) PHR for DFT-s-OFDM is 2 dB Based on that, the base station would know that DFT-s-OFDM might be a better waveform candidate, at least for similar or greater bandwidth allocations, when it is scheduling PUSCH. The PUSCH may be scheduled with a wider PRB allocation than the number of PRBs of the PUSCH for which the PHRs were reported. On the other hand, if the base station schedules PUSCH with the similar or narrower frequency allocation, it may be prefer CP-OFDM as some positive power headroom was reported for that waveform as well. The decision may be impacted also by power control commands sent by the base station after the PHRs, and/or by performance differences between CP-OFDM/DFT-s-OFDM receiver implementations at the base station.

Concerning the difference between waveform-specific values embedded in a PHR and multiple PHRs for different waveforms, it can be noted that with the embedded waveform-specific values, the reported values indicate a different metric than PHR, which allows, due to the smaller dynamic range, to use finer resolution, such as 0.5 dB, with fewer bits. The UE may report values indicating only the difference relative to the PHR value of current waveform, indicated as an absolute value. In another embodiment, the UE reports the difference against $P_{CMAX\_L,f,c}$, which presents the lower bound for the configured transmit power $P_{CMAX,c}$, that UE can choose. The base station can also determine the same $P_{CMAX\_L,f,c}$.

Expressed in other words, the benefits of waveform specific values embedded in PHR over multiple PHRs are better accuracy due to smaller quantization size and smaller bit-field size due to smaller range to be reported, due to the selection of reported value and associated reference point. The smaller number of bits required per value facilitates reporting by the UE of multiple values, such as for multiple PUSCH allocations such as the actual and a virtual PUSCH allocation. With multiple reported values, the base station gains a more complete understanding about preferable waveforms, facilitating a more efficient waveform selection.

Figure 3:
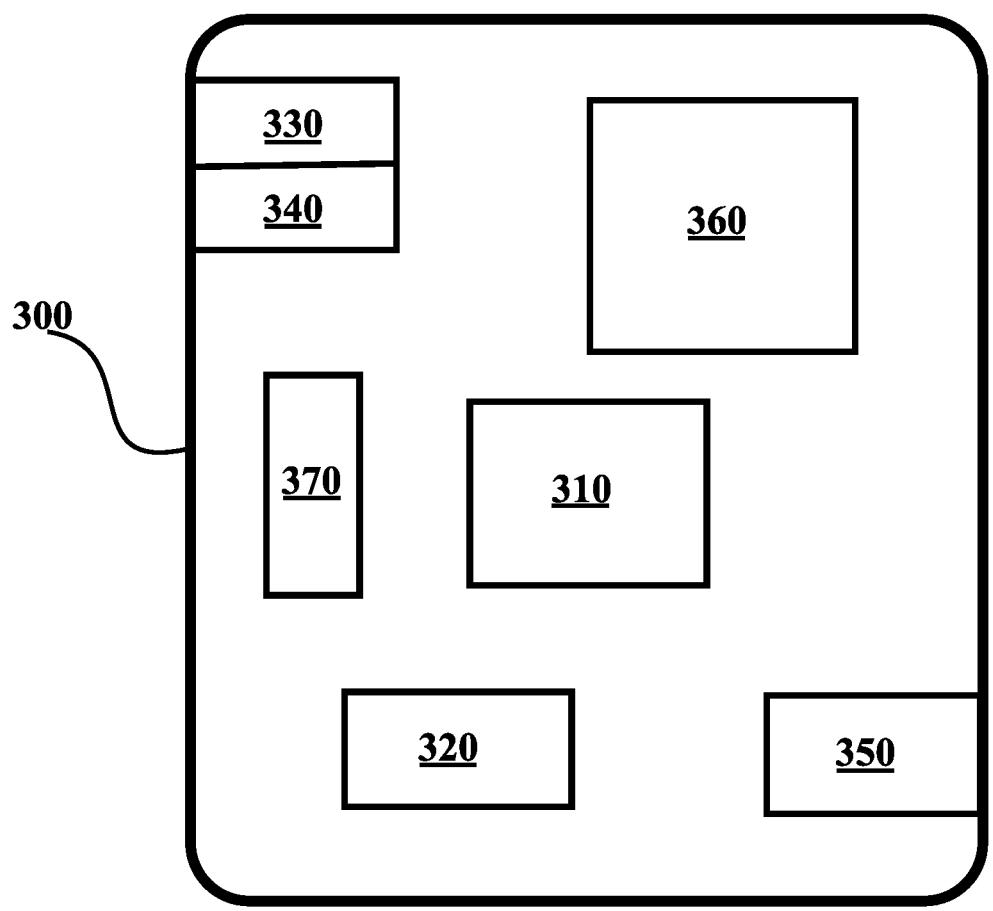
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a UE 110 or, in applicable parts, base station 130 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured or designed by ARM Holdings or a Zen processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps, such as transmitting, providing, selecting, performing and receiving in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or base station, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, New Radio, NR, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

FIG. 4 illustrates signalling in accordance with at least some embodiments of the present invention. On the vertical axes are disposed, on the left, UE 110 of FIG. 1, and on the right, base station 130 of FIG. 1. Time advances from the top toward the bottom. The signalling of FIG. 4 relates to autonomous switching by the UE.

In phase 410, UE 110 determines power headroom information for a first and a second waveform, such as CP-OFDM and DFT-s-ODFM, respectively, for example. In phase 420, UE 110 provides the first and second power headroom information to base station 130. For example, these may be provided to the base station by including in a PHR of the currently used CP-OFDM waveform additionally the second power headroom information as a waveform-specific value relating to the second waveform, DFT-s-ODFM. The waveform-specific value describes the power headroom if DFT-s-OFDM were used instead of CP-OFDM, relative to the power headroom report value relating to CP-OFDM in the CP-OFDM PHR. For example, the waveform-specific value may indicate that an additional 1.5 dB of power could be used if the second waveform, DFT-s-ODFM, were used instead of CP-OFDM and that the CP-OFDM power headroom is reported as +1 dB.

The UE and the base station are both configured to respond to such a power headroom report by switching over to using DFT-s-OFDM in PUSCH, without any separate indication of this from the base station. The base station determines this in phase 430 based on the report of phase 420, and the UE waits, phase 440, for a possible error message from the base station, as described herein above. In case the base station fails to correctly receive the PHR of phase 420, it would not know that the UE plans to autonomously switch to the second waveform, and a radio link error could ensue. Thus the UE waits, phase 440, to ensure the base station does not report an error in decoding the PHR 420, before switching over to the second waveform. The uplink shared channel is transmitted from UE 110 using the second waveform in phase 450.

Although described here as a power headroom report which uses the nominal maximum UE transmit power as reference, a similar process could be obtained in case the UE signals the available power for both waveforms in terms of the maximum achievable power in a current configuration from the UE, as described above in connection with the second example. In other words, the first and second power headroom information may be defined with reference to either the nominal maximum UE transmit power or the maximum achievable power in a current configuration. The current configuration may comprise, for example, parameter values used in transmission of a physical uplink channel, such as PRB allocation and modulation scheme.

FIG. 5 is a flow graph of a method in accordance with at least some embodiments of the present invention. The phases of the illustrated method may be performed in UE 110, for example, or in a control device configured to control the functioning thereof, when installed therein.

Phase 510 comprises transmitting, by an apparatus, information in a physical uplink shared channel direction using, selectably, a first waveform or a second waveform, the second waveform having lower peak to average power ratio than the first waveform. Phase 520 comprises providing, to a base station controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform. Finally, phase 530 comprises selecting to either continue using the first waveform on the physical uplink shared channel, or to switch to using the second waveform on the physical uplink shared channel.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless cellular communication.

ACRONYMS LIST

| | |
|---|---|
| ARQ | automatic repeat request |
| BPSK | binary phase-shift keying |
| CP-OFDM | cyclic prefix OFDM |
| DFT-s-OFDM | discrete Fourier transform-spread OFDM |
| FDSS | frequency domain spectrum shaping |
| HARQ | hybrid ARQ |
| MPR | maximum power reduction |
| OFDM | orthogonal frequency-division multiplexing |
| PAPR | peak-to-average power ratio |
| PH | power headroom |
| PHR | power headroom report |

-continued

ACRONYMS LIST

| | |
|---|---|
| PUCCH | physical uplink control channel |
| PUSCH | physical uplink shared channel |
| QPSK | quadrature phase-shift keying |

Technical Clauses:

Clause 1. An apparatus comprising at least one processing core, at least one memory including computer program code, the at least one memory and the computer program code being configured to, with the at least one processing core, cause the apparatus at least to:

transmit information in a physical uplink shared channel direction using, selectably, a first waveform or a second waveform, the second waveform having lower peak to average power ratio than the first waveform;

provide, to a network node controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform, and select to either continue using the first waveform on the physical uplink shared channel, or to switch to using the second waveform on the physical uplink shared channel.

Clause 2. The apparatus according to Clause 1, configured to provide the first and second power headroom information separately in two distinct power headroom reports.

Clause 3. The apparatus according to Clause 1, configured to provide the first and second power headroom information in a single power headroom report.

Clause 4. The apparatus according to any of Clauses 1-3, wherein the apparatus is configured to perform the selecting based at least in part on the first and second power headroom information without receiving an explicit instruction from the base station.

Clause 5. The apparatus according to any of Clauses 1-3, wherein the apparatus is configured to perform the selecting based at least in part on an instruction received from the base station in response to providing the first and second power headroom information.

Clause 6. The apparatus according to any of Clauses 1-3, wherein the apparatus is configured to perform the providing of the first and second power headroom information to the base station as a response to a triggering condition being fulfilled in the apparatus.

Clause 7. The apparatus according to Clause 6, wherein the triggering condition comprises one or more of the following: a set time period has elapsed since the previous providing of the first and second power headroom information, a path loss between the apparatus and the base station has changed more than a first threshold amount of change, the apparatus changes a maximum power reduction value of the apparatus, or a difference in transmit power, power headroom or configured maximum transmit power between the first and second waveform changes in excess of a second threshold amount of change.

Clause 8. The apparatus according to any of Clauses 1-7, wherein the maximum allowed transmit power is a nominal maximum allowed transmit power of the apparatus in any configuration, or a maximum allowed transmit power of the apparatus based on a user equipment power class of the apparatus.

Clause 9. The apparatus according to any of Clauses 1-7, wherein the maximum achievable transmit power is a maximum achievable transmit power of the apparatus in the configuration in use when the first and second power headroom information is provided to the base station.

Clause 10. The apparatus according to any of Clauses 1-9, wherein the apparatus is configured to provide the quantity of power between the maximum allowed transmit power, or the maximum achievable power using the second waveform, and the second transmit power that the apparatus would use to transmit on the physical uplink shared channel if the apparatus were using the second waveform, expressed relative to the quantity of power between the maximum allowed or achievable transmit power and the first transmit power.

Clause 11. The apparatus according to any of Clauses 1-10, wherein the maximum allowed transmit power, the first transmit power and the second transmit power are determined for a configured reference transmission that may differ from the transmission on the physical uplink shared channel and wherein the configuration of the reference transmission comprises at least one of a modulation scheme and frequency location of resource blocks.

Clause 12. An apparatus comprising at least one processing core, at least one memory including computer program code, the at least one memory and the computer program code being configured to, with the at least one processing core, cause the apparatus at least to:
  receive information on a physical uplink channel direction using, selectably, a first waveform or a second waveform, the second waveform having lower peak to average power ratio than the first waveform, and
  receive, from a user equipment, UE, attached to a cell controlled by the apparatus, first and second power headroom information, the first power headroom information disclosing a quantity of power between a maximum allowed or achievable transmit power and a first transmit power, currently used by the UE to transmit on the physical uplink channel using the first waveform, the second power headroom information disclosing a quantity of power between the maximum allowed transmit power, or a maximum achievable power using the second waveform, and a second transmit power that the UE would use to transmit on the physical uplink channel if the UE were using the second waveform, and
  select to either continue using the first waveform on the physical uplink channel, or to switch to using the second waveform on the physical uplink channel.

Clause 13. The apparatus according to any preceding Clause, wherein the first waveform is a cyclic prefix orthogonal frequency-division multiplexing, CP-OFDM, and the second waveform is a discrete Fourier transform-spread orthogonal frequency-division multiplexing waveform, DFT-s-OFDM.

Clause 14. A method comprising:
  transmitting, by an apparatus, information in a physical uplink shared channel direction using, selectably, a first waveform or a second waveform, the second waveform having lower peak to average power ratio than the first waveform;
  providing, to a network node controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform, and
  selecting to either continue using the first waveform on the physical uplink shared channel, or to switch to using the second waveform on the physical uplink shared channel.

Clause 15. The method according to Clause 14, wherein the first and second power headroom information is provided separately in two distinct power headroom reports.

Clause 16. The method according to Clause 14, wherein the first and second power headroom information is provided in a single power headroom report.

Clause 17. The method according to any of Clauses 14-16, wherein the selecting is performed based at least in part on the first and second power headroom information without receiving an explicit instruction from the base station.

Clause 18. The method according to any of Clauses 14-16, wherein the selecting is performed based at least in part on an instruction received from the base station in response to providing the first and second power headroom information.

Clause 19. The method according to any of Clauses 14-18, wherein the providing of the first and second power headroom information to the base station is performed as a response to a triggering condition being fulfilled in the apparatus.

Clause 20. A method, comprising:
  receiving, by an apparatus, information on a physical uplink channel direction using, selectably, a first waveform or a second waveform, the second waveform having lower peak to average power ratio than the first waveform, and
  receiving, from a user equipment, UE, attached to a cell controlled by the apparatus, first and second power headroom information, the first power headroom information disclosing a quantity of power between a maximum allowed or achievable transmit power and a first transmit power, currently used by the UE to transmit on the physical uplink channel using the first waveform, the second power headroom information disclosing a quantity of power between the maximum allowed transmit power, or a maximum achievable power using the second waveform, and a second transmit power that the UE would use to transmit on the physical uplink channel if the UE were using the second waveform, and
  selecting to either continue using the first waveform on the physical uplink channel, or to switch to using the second waveform on the physical uplink channel.

Clause 21. The method according to any of Clauses 14-20, wherein the first waveform is a cyclic prefix orthogonal frequency-division multiplexing, CP-OFDM, and the second waveform is a discrete Fourier transform-spread orthogonal frequency-division multiplexing waveform, DFT-s-OFDM.

Clause 22. An apparatus comprising means for:
  transmitting, information in a physical uplink shared channel direction using, selectably, a first waveform or a second waveform, the second waveform having lower peak to average power ratio than the first waveform;

providing, to a network node controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform, and selecting to either continue using the first waveform on the physical uplink shared channel, or to switch to using the second waveform on the physical uplink shared channel.

Clause 23. An apparatus comprising means for:

receiving information on a physical uplink channel direction using, selectably, a first waveform or a second waveform, the second waveform having lower peak to average power ratio than the first waveform, and receiving, from a user equipment, UE, attached to a cell controlled by the apparatus, first and second power headroom information, the first power headroom information disclosing a quantity of power between a maximum allowed or achievable transmit power and a first transmit power, currently used by the UE to transmit on the physical uplink channel using the first waveform, the second power headroom information disclosing a quantity of power between the maximum allowed transmit power, or a maximum achievable power using the second waveform, and a second transmit power that the UE would use to transmit on the physical uplink channel if the UE were using the second waveform, and selecting to either continue using the first waveform on the physical uplink channel, or to switch to using the second waveform on the physical uplink channel.

Clause 24. A non-transitory computer readable medium having stored thereon a set of computer readable instructions that, when executed by at least one processor, cause an apparatus to at least:

transmit information in a physical uplink shared channel direction using, selectably, a first waveform or a second waveform, the second waveform having lower peak to average power ratio than the first waveform;

provide, to a network node controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform, and select to either continue using the first waveform on the physical uplink shared channel, or to switch to using the second waveform on the physical uplink shared channel.

Clause 25. A non-transitory computer readable medium having stored thereon a set of computer readable instructions that, when executed by at least one processor, cause an apparatus to at least:

receive information on a physical uplink channel direction using, selectably, a first waveform or a second waveform, the second waveform having lower peak to average power ratio than the first waveform, and receive, from a user equipment, UE, attached to a cell controlled by the apparatus, first and second power headroom information, the first power headroom information disclosing a quantity of power between a maximum allowed or achievable transmit power and a first transmit power, currently used by the UE to transmit on the physical uplink channel using the first waveform, the second power headroom information disclosing a quantity of power between the maximum allowed transmit power, or a maximum achievable power using the second waveform, and a second transmit power that the UE would use to transmit on the physical uplink channel if the UE were using the second waveform, and select to either continue using the first waveform on the physical uplink channel, or to switch to using the second waveform on the physical uplink channel.

The invention claimed is:

1. An apparatus comprising at least one processing core, at least one memory including computer program code, the at least one memory and the computer program code being configured to, with the at least one processing core, cause the apparatus at least to:

transmit information in a physical uplink shared channel direction using, selectably, a first waveform or a second waveform, the second waveform having lower peak to average power ratio than the first waveform;

provide, in response to a triggering condition being fulfilled in the apparatus, to a network node controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform;

select to either continue using the first waveform on the physical uplink shared channel, or to switch to using the second waveform on the physical uplink shared channel; and the triggering condition comprises that a difference in power headroom between the first and second waveform changes in excess of a second threshold amount of change.

2. The apparatus according to claim 1, configured to provide the first and second power headroom information separately in two distinct power headroom reports.

3. The apparatus according to claim 1, configured to provide the first and second power headroom information in a single power headroom report.

4. The apparatus according to claim 1, wherein the apparatus) is configured to perform the selecting based at least in part on the first and second power headroom information without receiving an explicit instruction from the network node.

5. The apparatus according to claim 1, wherein the apparatus is configured to perform the selecting based at least in part on an instruction received from the network node in response to providing the first and second power headroom information.

6. The apparatus according to claim 1, wherein the triggering condition comprises further one or more of the following: a set time period has elapsed since the previous providing of the first and second power headroom information, a path loss between the apparatus and the network node has changed more than a second threshold amount of change, or the apparatus changes a maximum power reduction value of the apparatus, or a difference in transmit power or configured maximum transmit power between the first and second waveform changes in excess of the first threshold amount of change.

7. The apparatus according to claim 1, wherein the maximum allowed transmit power is a nominal maximum allowed transmit power of the apparatus in any configuration, or a maximum allowed transmit power of the apparatus based on a user equipment power class of the apparatus.

8. The apparatus according to claim 1, wherein the maximum achievable transmit power is a maximum achievable transmit power of the apparatus in the configuration in use when the first and second power headroom information is provided to the network node.

9. The apparatus according to claim 1, wherein the apparatus is configured to provide the quantity of power between the maximum allowed transmit power, or the maximum achievable power using the second waveform, and the second transmit power that the apparatus would use to transmit on the physical uplink shared channel if the apparatus were using the second waveform, expressed relative to the quantity of power between the maximum allowed or achievable transmit power and the first transmit power.

10. The apparatus according to claim 1, wherein the apparatus is configured to determine the maximum allowed transmit power, the first transmit power and the second transmit power for a configured reference transmission that may differ from the transmission on the physical uplink shared channel and wherein the configuration of the reference transmission comprises at least one of a modulation scheme and frequency location of resource blocks.

11. A method comprising:
transmitting, by an apparatus, information in a physical uplink shared channel direction using, selectably, a first waveform or a second waveform, the second waveform having lower peak to average power ratio than the first waveform;
providing, in response to a triggering condition being fulfilled in the apparatus, to a network node controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform;
selecting to either continue using the first waveform on the physical uplink shared channel, or to switch to using the second waveform on the physical uplink shared channel; and
the triggering condition comprises that a difference in power headroom between the first and second waveform changes in excess of a second threshold amount of change.

12. A non-transitory computer readable medium having stored thereon a set of computer readable instructions that, when executed by at least one processor, cause an apparatus to at least:
transmit information in a physical uplink shared channel direction using, selectably, a first waveform or a second waveform, the second waveform having lower peak to average power ratio than the first waveform;
provide, in response to a triggering condition being fulfilled in the apparatus, to a network node controlling a cell in which the apparatus is attached, first and second power headroom information, the first power headroom information disclosing a quantity of power between a maximum allowed or achievable transmit power and a first transmit power, currently used by the apparatus to transmit on the physical uplink shared channel using the first waveform, the second power headroom information disclosing a quantity of power between the maximum allowed transmit power, or a maximum achievable power using the second waveform, and a second transmit power that the apparatus would use to transmit on the physical uplink shared channel if the apparatus were using the second waveform;
select to either continue using the first waveform on the physical uplink shared channel, or to switch to using the second waveform on the physical uplink shared channel; and
the triggering condition comprises that a difference in power headroom between the first and second waveform changes in excess of a second threshold amount of change.

* * * * *